US010087096B2

(12) United States Patent
Hill

(10) Patent No.: US 10,087,096 B2
(45) Date of Patent: Oct. 2, 2018

(54) SLUDGE SEPARATION SYSTEM AND METHOD

(71) Applicant: Riles Edward Hill, Dahlonega, GA (US)

(72) Inventor: Riles Edward Hill, Dahlonega, GA (US)

( * ) Notice: Subject to any disclaimer, the term of this patent is extended or adjusted under 35 U.S.C. 154(b) by 395 days.

(21) Appl. No.: 14/986,103

(22) Filed: Dec. 31, 2015

(65) Prior Publication Data

US 2016/0272526 A1 Sep. 22, 2016

Related U.S. Application Data

(60) Provisional application No. 62/134,458, filed on Mar. 17, 2015.

(51) Int. Cl.
| | | |
|---|---|---|
| *C02F 11/18* | (2006.01) | |
| *C02F 11/12* | (2006.01) | |
| *C02F 103/22* | (2006.01) | |
| *C02F 1/00* | (2006.01) | |
| *C02F 1/24* | (2006.01) | |

(52) U.S. Cl.
CPC .............. *C02F 11/18* (2013.01); *C02F 11/12* (2013.01); *C02F 11/185* (2013.01); *C02F 1/24* (2013.01); *C02F 2001/007* (2013.01); *C02F 2103/22* (2013.01); *C02F 2209/005* (2013.01); *C02F 2209/02* (2013.01); *C02F 2209/10* (2013.01); *C02F 2209/42* (2013.01); *C02F 2301/08* (2013.01)

(58) Field of Classification Search
None
See application file for complete search history.

(56) References Cited

U.S. PATENT DOCUMENTS

| | | |
|---|---|---|
| 6,368,657 B1 | 4/2002 | Lee |
| 7,967,985 B1 | 6/2011 | Parjus |
| 8,163,176 B2 | 4/2012 | Hill |

OTHER PUBLICATIONS

PCT/US15/68298, Sludge Separation System and Method, Written Opinion, dated May 15, 2016.
PCT/US15/68298, Sludge Separation System and Method, Article 34 Letter, Jan. 17, 2017.
PCT/US15/68298, Sludge Separation System and Method, Declaration of Riles Edward Hill, Jan. 17, 2017.

*Primary Examiner* — Richard C Gurtowski
(74) *Attorney, Agent, or Firm* — Baker Donelson; Carl M. Davis, II

(57) ABSTRACT

A system and method for cracking sludge, comprising first and second decant vessels for receiving and continuous processing, which decant vessels include an outlet for decanting selectively separated watery residue to a drain and cracked decanted SPN solids to a transport, with graduated heat matrix processing of the sludge at sensor-monitored temperature and dwell time for cracking the sludge, and a programmable controller responsive to temperature and level sensors for adjusting the heat media communicated through the heat matrix and for determining completion of a sludge cracking process, with a heat member providing pre-process agitation of the sludge as an influent filing the decant vessel and elevating the temperature to a pre-process temperature over ambient.

29 Claims, 5 Drawing Sheets

SLUDGE SEPARATION SYSTEM AND METHOD

TECHNICAL FIELD

The present invention relates to the field of sludge separation that recovers by-product nutrients while minimizing waste residuals for disposal and returning clarified water to sanitary water supply systems for processing and discharge. More particularly, the present invention relates to automation control of sludge separation systems.

BACKGROUND OF THE PRESENT INVENTION

The meat industry, including the poultry processing industry, faced challenges with cost effective handling of sludge that results from processing. Sludge originates as the watery waste from meat processing and from cleaning of the process facilities. By volume, sludge is primarily water, but sludge also contains waste such as bone chips, skin parts, animal by-products, and scraps, of which some is valuable animal fat, protein and other nutrients. Efforts are made to extract at least some of the water from the sludge, such as by drainage from holding tanks, for subsequent transfer of the at-least partially dewatered sludge to rendering plants. Dewatering reduces the volume of sludge that is to be transported by truck and thus lowers the cost of handling processing plant waste. Further, water supply systems require processing plants to filter and clean the waste water before return to sanitary sewer systems.

The rendering process dries the sludge and separates fats from valuable bone, protein and nutrients, which are referred to as Secondary Product Nutrients (SPN) that can be sold to mill manufacturers of livestock and aquaculture feed for further beneficial uses and products. However, free fatty acids develop quickly and build-up in the sludge. As the sludge deteriorates, free fatty acids build up, and as the free fatty acids increase, the valuable animal fat and protein nutrients decrease. High concentrations of free fatty acids prevent further processing and use of the valuable SPN. The SPN all too often wind up in landfills and essentially a profitable by-product for the meat processing industry is thrown away.

There are difficulties with sludge processing whether for return of water to sanitary sewer systems or for further use of SPN after rendering of the processing wastes. SPN within sludge is solid sensitive such that it is difficult to break apart properly and de-water. Belt press devices and gravity dewatering process have been developed but there are drawbacks. Primarily, the end result was typically a product that was a prime target for pathogens and free fatty acid growth. This defective product was waste and lacked value but also resulted in unpleasant plant odor. Often sludge was transferred to landfill without recovery of the lucrative animal by-products.

My earlier U.S. Pat. No. 8,163,176 discloses an apparatus and method for cracking the sludge to break apart the fat, protein and solids from the waste and water. The fat and solids float to the top surface of the water and problematic pathogens and bacteria evaporate. The water drains from the stratified sludge, and the resulting decanted solids contain the profitable SPN with animal fat, protein and other nutrients and beneficially, without significant water content, have a significantly reduced volume for transport. The water may be cleaned appropriately for return to sanitary sewer systems. The decanted solids have high quality SPN content, reduced free fatty acid growth, and decreased odor.

The disclosed apparatus for cracking sludge, while successful, nevertheless requires significant manual labor for operating the apparatus in the practice of the process, and further, for large commercially significant meat processing facilities there is a need in the art for continuous process under automation that incorporates the batch process feature for cracking an on-going supply of ferric and non-ferric watery sludge generated by such facilities. It is to such that the present invention is directed.

SUMMARY OF THE PRESENT INVENTION

The present invention meets the need in the art by providing a sludge separation system for cracking sludge, comprising a source of sludge for being received in at least one decant vessel for sludge cracking processing. Each decant vessel comprises a cylindrical body and a conical portion with a sludge inflow intermediate opposing top and bottom ends of the decant tank and a discharge in the bottom end and communicating selectively with a decanted liquids discharge and a decanted solids discharge. A heat matrix disposed within the holding tank has a graduated heat transfer ranging from a first heat transfer capacity at a lower end to a second heat transfer capacity at an upper end, the first heat transfer capacity greater than the second heat transfer capacity. A heat member disposed in the conical portion of the decant vessel provides for heated agitation and mixing of sludge therein during filling of the decant vessel and to elevate the sludge from an ambient temperature to a first temperature below a cracking temperature. A supply provides a heat media for communicating selectively through the heat member, and upon filling of the decant tank through the heat matrix, for elevating a process temperature of the sludge from the first temperature to the cracking temperature while processing the sludge to form separated decanted liquid and decanted solids. A temperature sensor monitors the process temperature and a solids sensor monitors the flow of decanted solids from the decant vessel. A programmable controller responsive to the temperature sensor for adjusting the heat media communicated through the heat matrix and responsive to the solids sensor for determining flow of decanted solids after completion of a sludge cracking process. The process temperature being at the cracking temperature causes the sludge to crack into the decanted liquid and the decanted solids, and the decanted liquid discharges through the decanted liquids discharge until the solids sensor senses decanted solids discharging therethrough and thereupon closing the decanted liquids discharge and opening the decanted solids discharge for discharge of the decanted solids to a transport apparatus for providing the decanted solids to a renderer.

In another aspect, the present invention provides a method for separating animal by-product waste sludge, comprising the steps of:

(a) skimming animal by-product waste sludge from a dissolved air flotation tank having an animal by-product waste sludge inlet for receiving an inflow of water-borne animal by-product sludge from a meat processor facility;

(b) communicating the skimmed animal by-product waste sludge selectively to a first decant tank and a second decant tank alternatively, the first decant tank and the second decant tank each comprising:

a cylindrical portion and a conical portion therebelow;

an animal by-product waste sludge inflow intermediate opposing top and bottom ends of the decant tank and receiving therethrough the flow of animal by-product waste sludge skimmed from the air floatation tank;

a discharge in the conical portion and communicating selectively with a decanted water discharge outlet and a SPN solids discharge outlet;

a heat matrix disposed within the cylindrical portion and having a graduated heat transfer ranging from a first heat transfer capacity at a lower end to a second heat transfer capacity at an upper end, the first heat transfer capacity greater than the second heat transfer capacity;

a heat member disposed in the conical portion for heated agitation and mixing of animal by-product waste sludge and elevating a temperature thereof to a pre-process temperature less than a process temperature until reaching a capacity of the decant tank for step (c);

a level sensor for generating a level signal indicating a level of the animal by-product waste sludge within the decant tank;

a temperature sensor for generating a temperature signal indicating a process temperature of the animal by-product waste sludge within the decant tank during application of heat by the heat matrix for a predetermined dwell period for cracking the animal by-product waste sludge to form the decanted residual water and SPN solids; and a solids sensor for generating a solids signal indicating a flow through the discharge of the SPN solids formed in the decant tank during the cracking application of the heat by the heat matrix; and providing a controller configured for receiving and responding to signals from the respective level sensor, process temperature sensor, and SPN solids sensor;

(c) sensing with the level sensor the level of skimmed animal by-product waste sludge received in the respective first decant tank and second decant tank until a filled level is detected, then alternately repeating steps (b) and (c) for the other of the respective second decant tank and the first decant tank;

(d) upon the level of the skimmed animal by-product waste sludge reaching a lower portion of the heat matrix disposed in the respective decant tank, supplying a heat media to the heat matrix for elevating the process temperature to a predetermined cracking temperature for cracking the animal by-product waste sludge into the residual water and SPN solids (e) sensing the process temperature within the respective first and second decant tank and adjusting the heat media to maintain the process temperature at the cracking temperature for the dwell period for cracking of the animal by-product waste sludge therein into the residual water and SPN solids;

(f) sensing development of sludge cracking that stratifies the animal by-product waste sludge as the residual water and cracked sludge SPN solids;

(g) upon completion of the cracking of the animal by-product waste sludge, discharging the residual water through the discharge to the decanted water discharge outlet; and (h) upon the solids sensor sensing flow of SPN solids through the discharge, closing the decanted water discharge outlet and opening the SPN solids discharge outlet for communicating the SPN solids to a transport for delivery thereof to a rendering facility.

In another aspect, the present invention provides a sludge separation system for continuous cracking animal by-product sludge to yield SPN solids, comprising a first decant vessel and a second decant vessel which selectively receive animal by-product waste sludge from a source. The first decant vessel and second decant vessel each comprises a holding tank; a sludge inflow intermediate opposing top and bottom ends of the holding tank for receiving a flow of the animal by-product waste sludge from the source; a discharge in the bottom end and communicating selectively with a decanted water discharge outlet and a SPN solids discharge outlet; a heat matrix disposed within the holding tank and having a graduated heat transfer ranging from a first heat transfer capacity at a lower end to a second heat transfer capacity at an upper end, the first heat transfer capacity greater than the second heat transfer capacity; a level sensor for generating a level waste signal indicating a level of the animal by-product waste sludge received in the holding tank; a temperature sensor for generating a temperature signal indicating a process temperature of the animal by-product waste sludge in the holding tank during application of heat by the heat matrix for cracking the animal by-product waste sludge to form separated residual water and SPN solids; and a solids sensor for generating a second signal indicating a flow of the SPN solids developed in the holding tank during a cracking application of the heat by the heat matrix during a predetermined dwell period. A supply of a heat media is for communicating heat media through the heat matrix for the process of cracking the animal by-product waste sludge to form the separated residual water and SPN solids. A programmable controller operative for receiving from the respective first decant tank and the second decant tank the signal from the level sensor, the process temperature signal, and the solids signal thereof and responsive to the respective level sensor for controlling the inflow of the animal by-product waste sludge selectively into the first decant vessel and the second decant vessel alternatively for cracking processing, to the respective temperature sensor for determining the process temperature and adjusting the heat media communicated through the heat matrix within the respective first decant vessel and second decant vessel, and to the solids sensor for determining flow of SPN solids following completion of cracking process. Upon completion of cracking process within the respective first decant vessel and second decant vessel, decanting residual water therefrom through the decanted water discharge outlet and the solids sensor upon detecting the SPN solids flow through the discharge, closing the decanted water discharge outlet and opening the SPN solids discharge outlet for communicating the SPN solids to a transport for transportation to a rendering facility. A display is for displaying system status as determined by the controller receiving the respective level signals, temperature process signals and solids signals.

Objects, advantages, and features of the present invention will become apparent upon a reading of the following detailed description in conjunction with the drawings and the appended claims.

DETAILED DESCRIPTION

Figure 1A:
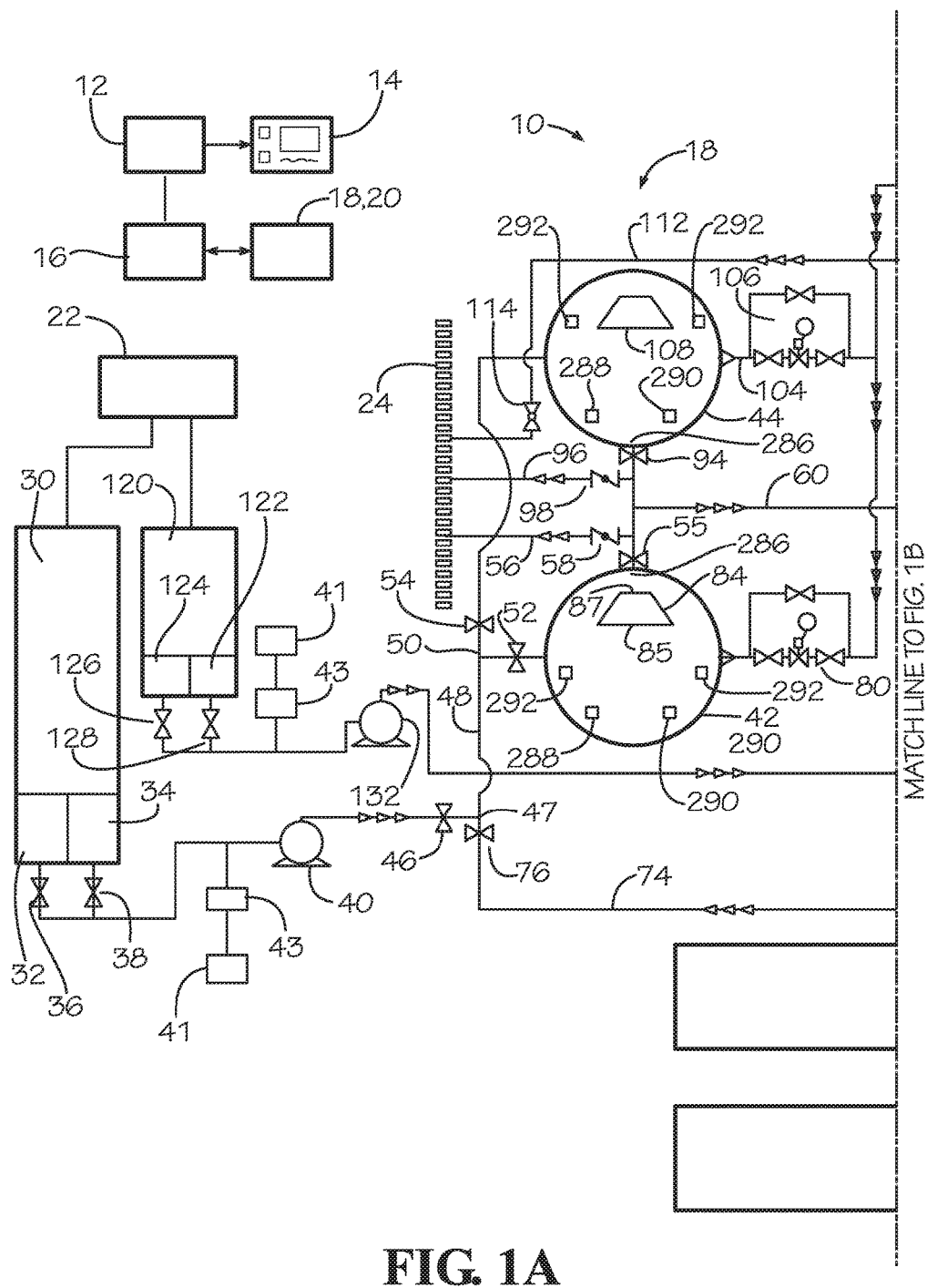
FIGS. 1A and 1B illustrate in schematic view the sludge separation apparatus in accordance with the present invention.
Figure 1B:
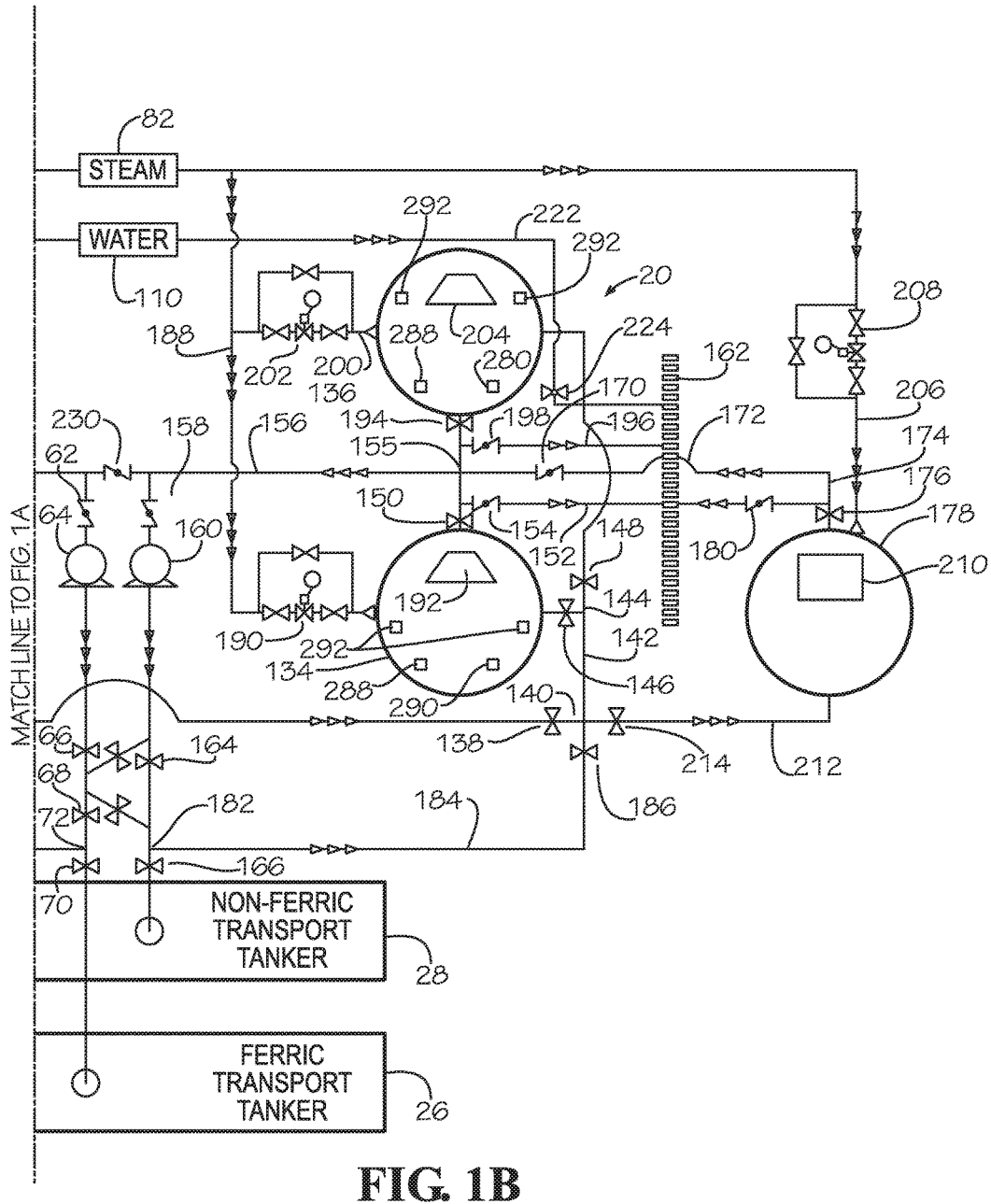

With reference to the drawings in which like parts have like reference numerals, FIGS. 1A and 1B illustrate in schematic view a sludge separation system 10 in accordance with the present invention. The sludge separation system 10 includes a microprocessor controller 12 configured with computer software programmed for supervisory control of the sludge separation system, data acquisition from various valves (actuators and position indicating switches) and sensors of the sludge separation system, and display of system status and alerts on a display 14 for an operator to monitor the equipment and process, direct actions of the system, and to enter data and commands as appropriate during operation of the system. The controller 12 communicates with a programmable logic controller 16 (PLC 16) that directly connects to system monitoring and control devices (pumps, valves, sensors, push-buttons and the like) for monitoring and operational control.

The sludge separation system 10 in the illustrated embodiment provides independent ferric process apparatus generally 18 and non-ferric process apparatus generally 20. FIG. 1A schematically indicates the controller 12, the display 14, the PLC 16 with the PLC connected by a line to the process apparatus shown by a symbolic representation box followed by an arrow pointing from that symbolic representation to a larger schematic of the processing apparatus 18 and 20. Each processing apparatus 18 and 20 processes watery sludge received from a meat facility processing generally 22 for separating water and SPN-content solids as disclosed herein. The water decants into a drain 24 for water treatment and clarifying prior to discharge to a sanitary sewer system. The SPN-content solids discharge to tanker vehicles 26, 28 that transport the SPN-content solids to rendering plants for conventional processing to extract the SPN for use in other products.

As a general overview, the automation system comprises:
  (a) PLC (Programmable Logic Controller) 16
  (b) SCADA Computer (Supervisory Control and Data Acquisition) (located in an operations office) 12
  (c) Valve Actuators (pneumatic actuated with electric control solenoid for valve actuation upon signal from PLC)
  (d) Valve Position Indicating Limit Switches (indicating open and closed states for valves)
  (e) Temperature Control Valves 80, 106, 190, and 202 that regulate steam pressure (heat media in the illustrated embodiment) for heat control of the separation process within the respective decant tank
  (f) Pump Motor Starters for starting pumps under direction of the PLC 16 (or manually through the controller 12)
  (g) Temperature Sensors (one per decant tank) (a second temperature sensor may be provided for use during manual operations)
  (h) Radar Level Sensors (one per decant tank) (for detection of the level of the skimmed sludge received in the decant tank)
  (i) High Level Sensors (such as BINDICATOR level sensors (one per decant tank) as a backup to the Radar Level Sensors)
  (j) Solids Sensing Probes (one each in the decant tanks; to sense decant flow for watery residue and for slurry of cracked sludge and fats)
  (k) Alarm Horn and Alarm Strobe Light located on top of PLC Panel
  (l) Emergency Stop Button located on the front of the PLC Panel (a red mushroom-head maintained contact emergency stop pushbutton)
  (m) Load/Pause Pushbuttons (for example, located on a catwalk above the tanker loading stations) (one each for the ferric and non-ferric tankers 26, 28)
  (n) Washdown Alarm Silence Button located on front of the PLC Panel (for example, a green momentary 30 mm pushbutton) (to silence an alert relating to washing of the decant tank)

The PLC 16 is a special purpose computer for industrial applications with the following characteristics in the illustrated embodiment:
  (a) Operates in a temperature range of 32° F. to 140° F.;
  (b) Built-in surge suppression;
  (c) Directly connects to field monitoring and control devices (pumps, valves, sensors, push-buttons, etc.);
  (d) Sequential scanning logic (starts at the beginning of the program, executes the entire program and then starts the over in a continuous loop; and
  (e) Programmed in IEC 1131 FBD Language, or other appropriate sensor monitoring software.

With continued reference to FIGS. 1A and 1B, the ferric apparatus 18 of the sludge separation system 10 includes a dissolved air flotation tank 30 that receives influent of watery sludge from the processing facility 22. Two compartments 32, 34 receive skimmed sludge from the dissolved air flotation tank 30. Although not illustrated, the residual water in the dissolved air floatation tank 30 discharges into the water drain 24. Each compartment 32, 34 includes an outlet with a valve 36, 38 that controls flow of skimmed sludge from the respective compartment through a pipe to a transfer pump 40. The pump 40 communicates the skimmed sludge to at least one decant tank. It is preferred that the transfer pump 40 provide for transfer of the skimmed sludge with minimal shearing, such as provided by a rotary load, high volume, low pressure pump. In an alternate embodiment, a polymer supply 41 communicates with an injector 43 for injection of a heat-tolerant polymer into the skimmed sludge communicating to the pump 40, which polymer assists with the cracking process. Alternately, polymer material may also be inserted in the raw sludge prior to entry to the dissolved air floatation tank.

The illustrated embodiment includes a first decant tank 42 and a second decant tank 44. This permits continued filling of skimmed sludge into one decant tank while the other is in cracking process, as discussed below. Depending on capacity requirements of the meat processing facility 22, additional decant tanks may be gainfully included in a particular sludge separation system. The pump 40 communicates though a valve 46 to a tee 47 having a flow pipe 48 and a tee 50. Valves 52 and 54 connect to the tee 50. The valve 52 connects to the inflow for the decant tank 42; the valve 54 connects to the inflow of the decant tank 44.

The piping and valves for the first decant tank 42 will be discussed first. The valve 52 connects to the inflow for the first decant tank 42. The decant tank 42 includes a decant discharge at a lower end and having a decant valve 55. The decant valve 55 connects through a tee to a decant water discharge pipe 56 controlled by a valve 58 and to a decant solids discharge pipe 60 controlled by a valve 62 to an intake side of a pump 64. The decant water discharge pipe 56 discharges to the water drain 24. The output side of the pump 64 communicates through valves 66, 68, and 70 to a discharge to the ferric tanker 26. The valves 68 and 70 connect on opposing sides of a tee 72. A return pipe 74 connects to the tee 72. The return pipe 74 connects through a valve 76 to the tee 47.

A steam pipe 78 connects through a pressure relief valve 80 to a supply 82 of steam. In the illustrated embodiment, the pressure relief valve 80 is a component of a conventional steam supply valve and piping assembly. The assembly includes isolator valves before and after the pressure relief valve 80 and a bridging piping and valve before and after the isolator valves. The isolator valves and bridge valve may be manually operated in order to bypass the pressure relief valve 80 for maintenance or replacement without delay or stoppage of the sludge separation process.

The steam inlet pipe 78 connects to a heat matrix generally 84 disposed within the decant tank 42 intermediate opposing ends. The heat matrix 84 provides a graduated heat transfer to the skimmed sludge held in the decant tank. The heat transfer ranges from a first heat transfer capacity at a lower end 85 of the heat matrix to a second heat transfer capacity at an upper end 87. In the illustrated embodiment, the first heat transfer capacity is provide by the heat matrix having a first surface area at the lower end and a second surface area at the upper end, in which the first surface area is greater than the second surface area. The illustrated embodiment uses the heating directional grid disclosed in U.S. Pat. No. 8,163,176, which is incorporated herein in its entirety by reference. It is to be appreciated that alternate graduated heat transfer structures may be gainfully employed for the heat matrix 84.

The piping and valves for the second decant tank 44 are described next. The inflow of skimmed sludge communicates through the valve 54 to the second decant tank 44. The decant tank 54 includes a decant discharge at a lower end and having a decant valve 94. The decant valve 94 connects through a tee to a decant water discharge pipe 96 controlled by a valve 98 and to the decant solids discharge pipe 60 controlled by the valve 62. A steam inlet pipe 104 connects through a pressure relief valve 106 to the steam supply 82. The pressure relief valve 106 is part of a steam supply assembly as discussed above regarding the pressure relief valve 80. The steam pipe 104 connects to a heat matrix 108, such as a same structure as of the heat matrix 84 discussed above.

A water supply 110 connects with piping 112 to a valve 114 and a discharge to the water drain 24.

The process apparatus 20 of the sludge separation system 10 includes a dissolved air flotation tank 120 that receives influent of watery non-ferric type sludge from the processing facility 22. The tank 120 includes a pair of compartments 122, 124 that selectively receive sludge skimmed from the dissolved air flotation tank. Although not illustrated, the residue water in the dissolved air floatation tank discharges to the water drain 162. Each compartment 122, 124 includes an outlet with a respective valve 126, 128 that control flow of skimmed sludge from the respective compartment through a flow pipe to a transfer pump 132. The pump 132 communicates the skimmed sludge from the respective compartment 122, 124 to at least one non-ferric decant tank. Thus, one compartment 122, 124 may be filling while the other compartment 124, 122 is draining. It is preferred that the transfer pump 132 provide for transfer of the skimmed sludge with minimal shearing, such as provided by a rotary load, high volume, low pressure pump. An alternate embodiment includes the polymer supply 41 that communicates with the injector 43 for injection of the heat-tolerant polymer into the skimmed sludge communicating to the pump 132, which polymer assists with the cracking process.

The illustrated embodiment includes a first non-ferric decant tank 134 and a second non-ferric decant tank 136 (see FIG. 1B). This permits continued filling of skimmed sludge into one decant tank while the other is in cracking process, as discussed below. Depending on capacity requirements of the meat processing facility, additional decant tanks may be gainfully included in a particular sludge separation system. The pump 132 communicates though a valve 138 to a 4-tee 140 having a flow pipe 142 and a tee 144. Valves 146 and 148 connect to the tee 144. The valve 146 connects to the inflow for the decant tank 134; the valve 148 connects to the inflow of the decant tank 136.

The piping and valves for the first decant tank 134 will be discussed first. The valve 146 connects to the inflow for the first decant tank 134. The decant tank 134 includes a decant discharge at a lower end having a decant valve 150. The decant valve 150 connects through a tee to a decant water discharge pipe 152 controlled by a valve 154. The other side of the tee connects to a 4-tee 155. A second leg of the 4-tee 155 connects to a decant solids flow pipe 156 controlled by a valve 158 to an intake side of a transfer pump 160. The decant water discharge pipe 152 discharges to a water drain 162. The output side of the pump 160 communicates through valves 164 and 166 to a discharge to the non-ferric tanker 28.

A third leg of the 4-tee 155 connects through a valve 170 in a pipe 172 having a tee 174 to a valve 176 for an opening to a superheater tank 178. The second leg of the tee 174 connects through a valve 180 to a discharge to the water drain 162. The valves 164 and 166 connect on opposing sides of a tee 182. A return pipe 184 connects to the tee 182. The return pipe 184 connects through a valve 186 to a leg of the 4-tee 140. A flow pipe 212 connects between the superheater 178 through a valve 214 to the fourth leg of the 4-tee 140. A steam inlet pipe 188 connects through a pressure relief valve 190 to the steam supply 82. The pressure relief valve 190 is part of a steam supply assembly as discussed above regarding the pressure relief valve 80. The steam inlet pipe 188 connects to a heat matrix generally 192 disposed within the decant tank 134 intermediate opposing ends. The heat matrix 192 is of a type as the heat matrix 84 discussed above.

The piping and valves for the second non-ferric decant tank 136 are described next. The inflow of skimmed sludge communicates through the valve 148 to the second decant tank 136. (The valve 142 in a closed state.) The decant tank 136 includes a decant discharge at a lower end and having a decant valve 194. The decant valve 194 connects through a tee to a decant water discharge pipe 196 controlled by a valve 198 and to the fourth leg of the 4-tee 155. The 4-tee connects to the decant solids discharge pipe 156 controlled by the valve 158 and to the pipe 172 controlled by the valve 170. A steam inlet pipe 200 connects through a pressure relief valve 202 to the steam supply 82. The pressure relief valve 202 is part of a steam supply assembly as discussed above regarding the pressure relief valve 80. The steam pipe 200 connects to a heat matrix generally 204, such as a structure of the heat matrix 84 discussed above. The heat matrix 204 is disposed within the second non-ferric decant tank 136 intermediate opposing ends.

A steam inlet pipe 206 connects through a pressure relief valve 208 to the steam supply 82. The steam inlet pipe 206 connects to a heat exchanger generally 210 disposed within the superheater 178 intermediate opposing ends.

The water supply 110 connects with piping 222 to a valve 224 and a discharge to the water drain 162.

Bridging valves and piping (generally designated 230 and 232) enable manual routing of flow in the event of equipment repair or replacement.

A respective load/pause switch (not illustrated) allows the operator to direct the controller 12 to commence loading the transport tanker 26, 28 and to pause loading for tanker change-out. Typically, an overhead walkway or loading platform provides an observation location for the operator to observe the loading.

Figure 2:
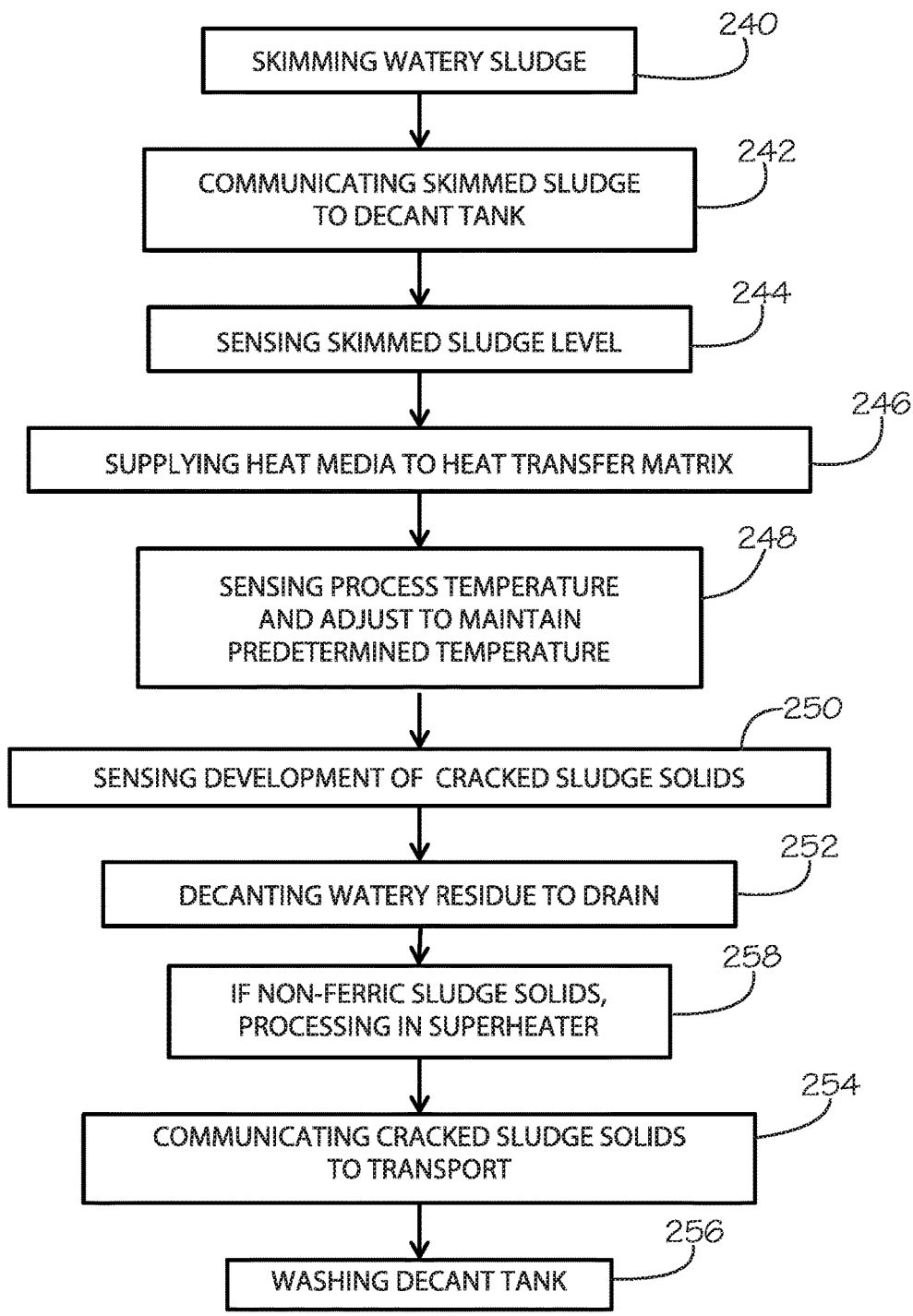
FIG. 2 illustrates a process flow for sludge separation using the apparatus illustrated in FIG. 1.

FIG. 2 illustrates in schematic flow diagram a method for separating sludge, in illustrative but not limiting reference to the decant tank 42 as the process applies to the other decant tanks 44 on the ferric side 18 and the decant tanks 134, 136 on the non-ferric side 20. The method comprises the steps of:
 (a) skimming 240 sludge from the dissolved air flotation tank 30 that has a sludge inlet for communicating the inflow of watery waste sludge from the meat processor facility 22;
 (b) communicating 242 the skimmed sludge to the decantation tank 42;
 (c) sensing 244 with a level sensor the level of skimmed sludge received in the decantation tank 42;
 (d) upon the level of the skimmed sludge reaching the lower portion of the heat transfer matrix 84 disposed in the decantation tank 42, supplying 246 a heat media to the heat transfer matrix 84, the heat matrix having a graduated heat transfer ranging from a first heat transfer capacity at a lower end to a second heat transfer capacity at an upper end, the first heat transfer capacity greater than the second heat transfer capacity;
 (e) sensing 248 the process temperature within the decantation tank 42 and adjusting the heat media to maintain the process temperature at a predetermined temperature for a predetermined period;
 (f) sensing 250 development of sludge cracking and stratifying of the skimmed sludge to a watery residue and cracked sludge solids;
 (g) upon completion of the sludge cracking, decanting 252 the watery residue through the outlet 55 of the decantation tank 42 for a water clarification process prior to discharge into a sanitary sewer system;
 (h) communicating 254 the cracked sludge solids to a transport 26 for delivery to a rendering facility; and
 (i) washing 256 the decantation tank 42.

In one aspect, the predetermined temperature for processing ferric sludge during steps (d), (e) and (f) is between about 140° F. to about 200° F., more preferably, about 160° F. to about 180° F., with a dwell period of between about 2 hours to about 6 hours. The cracking process temperature and dwell time varies based on the particular by-product content of the skimmed sludge.

In another aspect, the process pre-heats sludge held in the decantation tank 42 during steps (b) and (c) above to about 115° F.

Further, in the embodiment using the apparatus 20 for the non-ferric sludge, the apparatus processes 258 the decanted non-ferric sludge in pathogen kill pasteurization stage prior to step (h) communicating 254, comprising the pathogen kill steps of:
 communicating the non-ferric cracked sludge solids to the superheater tank 178; and
 heating the non-ferric cracked sludge solids in the superheater tank 178 to a predetermined temperature for a predetermined period. Typically, a pathogen kill stage occurs at temperatures of about 200° F.-200° F. during a 12-30 minute dwell period, depending for example on the components of the cracked solids and fats.

Figure 3:
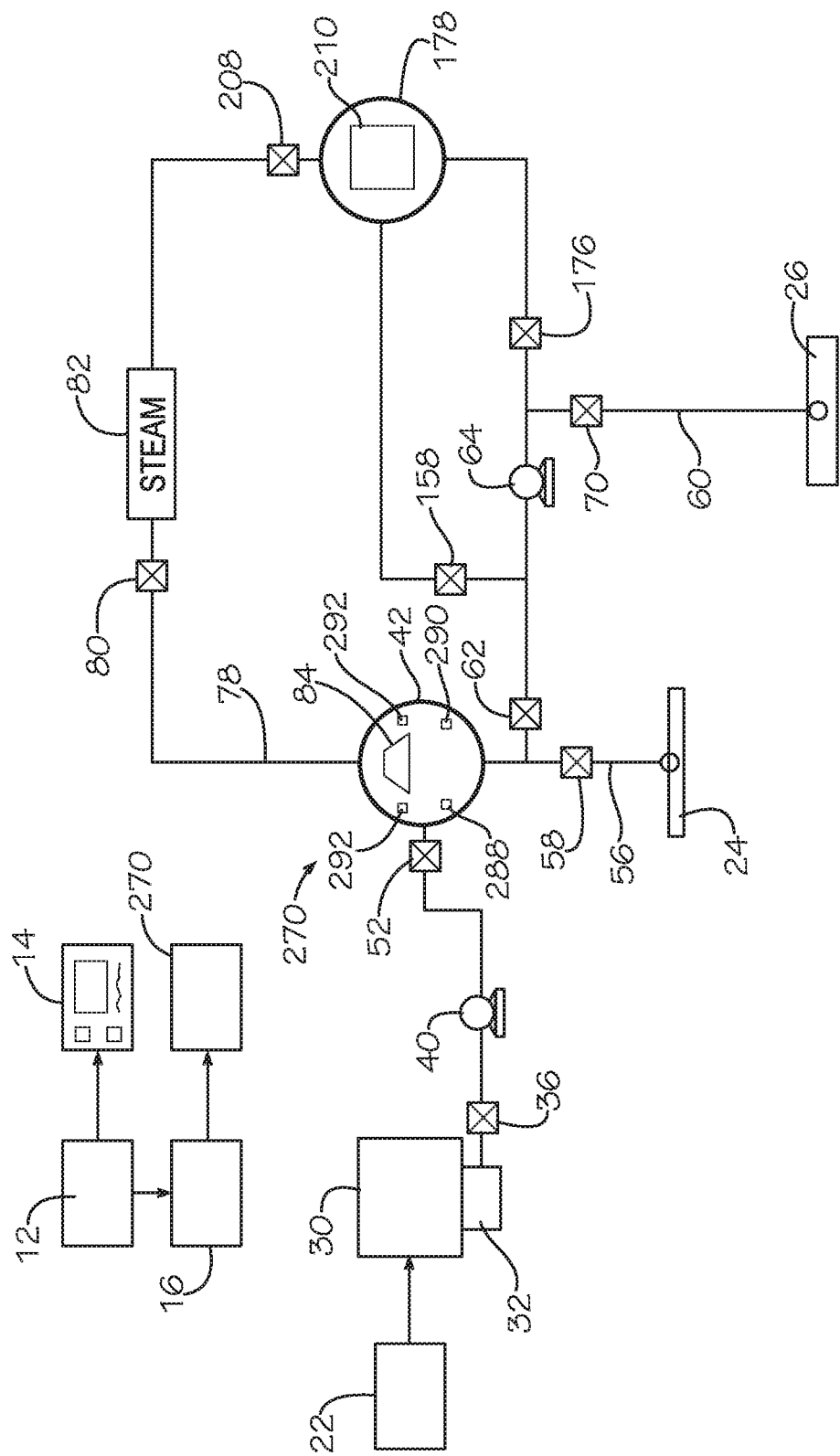
FIG. 3 illustrates an alternate embodiment of the sludge separation apparatus.

FIG. 3 illustrates an alternate embodiment of the sludge separation apparatus according to the present invention providing an automated batch process apparatus 270 and method readily implemented in a smaller apparatus package having the dissolved air flotation tank 30 and the decant tank 42 interconnected for communication of skimmed sludge, for processing with the heat matrix 84, and discharge of the separated watery residue to the water drain 24 and the cracked sludge solids to the tanker 26, and alternatively including the superheater tank 178 for post-cracking pathogen kill of the SPN non-ferric sludge and fats.

Figure 4:
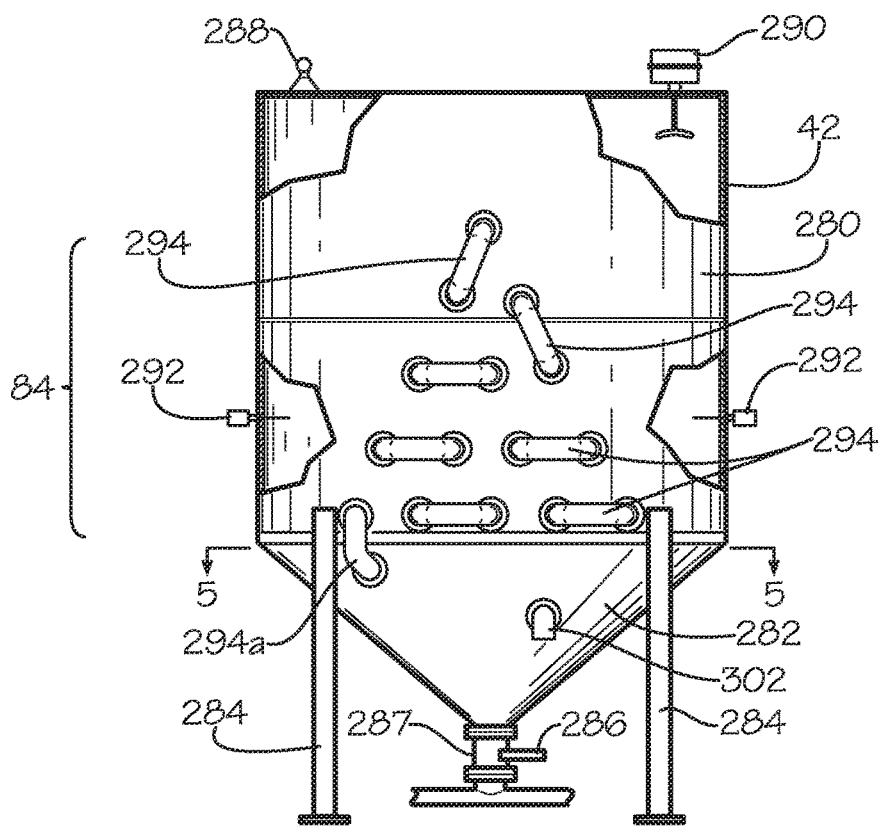
FIG. 4 illustrates a side elevational view of a decant tank for the sludge separation apparatus shown in FIG. 1 with features shown in detailed cut-away view.

FIG. 4 illustrates a side elevational view of the decant tank 42 representative of the decant tanks 44, 134, and 136 useful in the sludge separation system 10 and features for the sludge separation system are shown in cut-away detailed view. The decant tank 42 comprises a cylindrical body 280, a conical discharge portion 282, and a plurality of support legs 284. In the illustrated embodiment, the decant tank 42 has a capacity for 6,000 gallons of skimmed sludge, but the capacity size may differ to meet particular facility requirements. A solids sensing probe 286 mounts to a down pipe 287 at the discharge of the decant tank 42. A preferred sensor is a HACH SOLITAX turbidity and suspended solids high temperature probe, available from Hach Company, Loveland, Colo. A level sensing radar 288 mounts at an upper edge of the decant tank, such as to a support or a lid or cover for the decant tank 42. Also, a high level direct contact sensor 290 mounts similarly at an upper edge of the decant tank 42. The direct contact sensor 290 provides a back-up sensor for the radar 288. A pair of temperature sensing probes 292 mount to the wall of the cylindrical portion 280 intermediate the lower and upper extents of the heat matrix 84. One probe 292 communicates with the PLC 16 for signaling temperature signals during automated operations while the other probe communicates temperature signals for use during manual operations as may be necessary from time-to-time.

Figure 5:
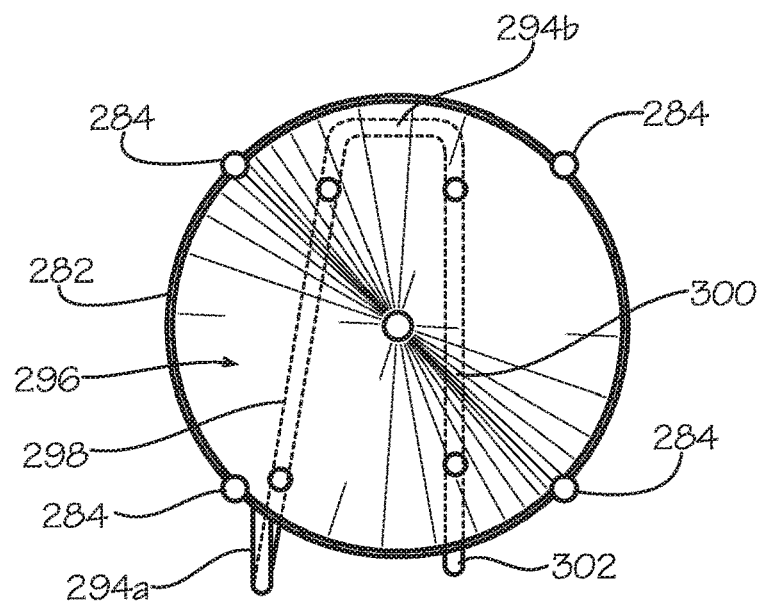
FIG. 5 illustrates a cross-sectional view of the decant tank illustrated in FIG. 4 taken along line 5-5.

A continuous loop of piping members defines the heat matrix 84 (described in U.S. Pat. No. 8,163,176 and incorporated in its entirety by reference) which loops back and forth through a lower portion of the cylindrical body 280 with turns 294 on the exterior and straightaway portions on the interior. With reference to FIG. 5 showing a cross-sectional view of the decant tank 42 taken along line 5-5, the illustrated embodiment further includes in the conical portion 282 a heat member 296 for heating agitation and mixing of skimmed sludge within the conical portion 282. The heat member 296 in the illustrated embodiment has two straightaway portions 298, 300 interior of the conical portion 282. The straightway portion 298 connects to the heat matrix 84 with an exterior portion 294a and an opposing exterior portion 294b defines a return for the second straightaway portion 300. The second straightaway portion 300 terminates exterior of the conical portion with a 90° elbow 302 for connecting to a steam trap and condensate discharge line (not illustrated). The further heat member 296 facilitates agitation and mixing within the skimmed sludge in the conical portion 282 and the stratified watery portion that results from the cracking processing of the skimmed sludge received in the decant tank 42.

The operation of the sludge separation system 10 as to ferric sludge is more particularly described with reference to FIGS. 1A and 1B in which the watery ferric sludge flows to the dissolved air flotation tank 30 from the processing facility 22. The sludge stratifies forming floating sludge on water residue. A skimmer skims the sludge into a selected one of the compartments 32, 34. The compartments 32, 34 alternate with filling. Once the receiving compartment is filled, the controller 12 operates to have the other compartment receive the skimmed sludge while the skimmed sludge in the former compartment transfers via the pump 40 to a selected one of the decant tanks 42, 44. In this example, the skimmed sludge from compartment 32 transfers to the decant tank 42. This is accomplished by opening valve 36 (valve 38 is closed), and opening valves 46 and 52 with valves 54 and 76 closed. After the first decant tank 42 is filled, valve 52 is closed and valve 54 opened, for the continuous process to fill the second decant tank 44.

As the inflow of skimmed sludge reaches a lower portion of the heat matrix 84, the steam supply 82 provides steam through the steam inlet pipe 78 and pressure relief valve 80. Initially, the steam supply is set to provide a pre-process temperature for the skimmed sludge in the decant tank 42 of about 115° F. The temperature sensor 292 monitors the process temperature and communicates with the controller 12. The PLC 16 regulates the pressure relief valve 80 to control the supply of steam to the decant tank 42, and thus changes the process temperature as appropriate. A discharge pipe (not illustrated) returns condensed water to the steam supply 82 or discharges condensate to the drain. The sensor 288 (backed by the sensor 290) monitors the level of the skimmed sludge in the decant tank 42, and when capacity is reached, the controller 12 stops the pump 40 and closes the valve 52. Such sensors useful with the present invention are BINDICATOR point and continuous level sensors for industrial applications available from Venture Measurement company, Danaher Corporation, Spartanburg, S.C. 29306.

The controlled heating with the graduated heat matrix 84 allows the sludge to crack or separate from the water portion of the skimmed sludge and stratify within the decant tank 42 during cracking processing for a predetermined dwell period at about a predetermined temperature. In an embodiment processing 6,000 gallon capacity skimmed sludge, the predetermined temperature for ferric sludge is between about 140° F. to about 200° F., more preferably, about 160° F. to about 180° F., with a dwell period of between about 2 hours to about 6 hours. The cracking process temperature and dwell time varies based on the particular by-product content of the skimmed sludge. The dwell and controlled heating process cracks the skimmed sludge and stratifies as residual water and a slurry of cracked sludge solids and fats. The slurry may contain some water content.

Upon completion of cracking of the skimmed sludge, the decant valve 55 opens to allow the decant water to flow from the bottom of the decant tank 42 through the discharge pipe 56 to the water drain 24 for further clarification treatment before discharge into a sanitary sewer. The solids sensor 286 monitors the flow of the decanting materials (first, watery residue and then second, changing to the slurry). Upon completing the discharge of the watery residue to the drain 24, the valve 55 closes. The valve 62 opens, and the pump 64 starts. The pump 64 moves the slurry through the decant solids discharge pipe 60, and through the open valves 66, 68 and 70 to discharge into the tanker 26. (These valves cooperate with the bypass valves and piping generally 230 and 232, in the event manual shunting is required for rerouting flows to avoid process shutdown such as for servicing requirements.)

Once the level sensor 288 detects the decant tank 42 is empty, the monitor 14 displays a message that the tank requires washing. The tank is washed, such as starting with the upper end of the tank and the upper end of the heat matrix 84 and working downwardly to remove stuck sludge and cleaning the temperature probes 292. The valve 62 is closed and the valve 58 opened to discharge the wash water and residual material to the water drain 24. The operator enters a signal to the controller 12 of the ready state of the decant tank 42. The decant tank 42 is then ready to again receive skimmed sludge for processing.

The second decant tank 44 receives skimmed sludge from the pump 40 once the first decant tank 42 is filled to capacity. This is accomplished by stopping the pump 40, closing valve 52 and opening valve 54. The controlled heating process operates in the second decant tank 44 as indicated above relative to the first decant tank 42. As the inflow reaches the lower portion of the heat matrix 108, the steam supply 82 provides steam through the relief valve 106 and the inlet pipe 104. The temperature is controlled to provide an initial temperature of about 115° F. for preheat and for holding the content in the event no more skimmed sludge is available until after the facility 22 generates additional watery sludge.

Upon reaching capacity, the pump 40 stops and the valve 54 closes. The steam supply provides process heat to the decant tank 44. The cracking skimmed sludge stratifies in the decant tank 44 as residual water and slurry of cracked sludge solids and fats. Upon completion, the decant valve 94 opens to allow residue water to flow through the decant water discharge pipe 96 to the water drain 24. The solids sensor 286 monitors the flow of the decanting materials (first, watery residue and then second, changing to the slurry). Once the residue water is drained, the valve 98 closes, and the valve 62 opens. The pump 64 starts, and the decant solids (cracked sludge solids and fats) flow through the discharge pipe 60 and valves 66, 68 and 70 to the tanker 26. Upon completion of the transfer, the valve 62 closes; the tank 44 is washed as discussed above to make it ready for subsequent processing of receiving skimmed sludge, cracking the skimmed sludge, and discharging the decant solids and residue water. The present system accordingly provides a continuing process of stratifying raw sludge to yield skimmed sludge, filling the decant tank with skimmed sludge, processing the skimmed sludge, and discharging residual water and separated SPN solids and fats, alternately and continuously relative to the two decant tanks 42, 44.

With continuing reference to FIGS. 1A and 1B, the sludge separation system 10 further operates for separating non-ferric sludge in which the watery non-ferric sludge flows to the dissolved air flotation tank 120 from the processing facility 22. The sludge stratifies forming floating sludge on water residue. A skimmer skims the sludge into a selected one of the compartments 122, 124. The compartments 122, 124 alternate with filling and with communicating skimmed sludge to the selected one of the decant tanks 134, 136. Once the receiving compartment is filled, the other compartment receives the skimmed sludge while the skimmed sludge in the former compartment transfers via the pump 132 to the selected one of the decant tanks 134, 136.

In this example, the skimmed sludge from the compartment 122 transfers to the decant tank 134. This is accomplished by opening valves 138 and 142 (valves 148, 186 and 214 are closed. The pump 132 operates, and skimmed sludge moves through the pipes and into the decant tank 134. The sensor 288 (with back-up detection by sensor 290) monitors the level of the skimmed sludge in the decant tank 134. When tank capacity is reached, the PLC 16 stops the pump 132 and closes the valve 142. Valve 148 opens and the pump 132 starts, for the continuous process under the monitoring and control of the PLC 16 to fill the second decant tank 136 (if its status is ready for receiving skimmed sludge).

With continued reference to the decant tank 134 during infill stage, as the inflow of skimmed sludge reaches the lower portion of the heat matrix 192, the steam supply 82 provides steam through the steam inlet pipe 188. Initially, the heat controller is set to provide heat so that skimmed sludge in the tank 134 is at about 115° F. during filling or hold periods. The temperature sensor 292 monitors the process temperature and communicates with the PCL 16. The PLC 16 regulates the pressure relief valve 190 to control the supply of steam to the decant tank 134, and thus changes the process temperature as appropriate. A pipe (not illustrated) returns condensed water to the steam supply 82 or to condensate discharge to the water drain.

The controlled heating with the graduated heat matrix 192 allows the skimmed sludge to crack or separate. The cracking process stratifies the skimmed sludge within the decant tank as residual water and a slurry of cracked sludge solids and fats. In an embodiment processing 6,000 gallon capacity skimmed sludge, the predetermined temperature for non-ferric sludge is between about 140° F. to about 200° F., more preferably, about 160° F. to about 180° F., with a dwell period of between about 2 hours to about 6 hours. The cracking process temperature and dwell time varies based on the particular by-product content of the skimmed sludge. The temperature is generally lower for non-ferric sludge with a longer dwell time than for ferric sludge, based on sludge composition and generally lower fat content.

Upon completion of cracking of the skimmed sludge, the decant valve 150 and the valve 154 open (valves 158, 194, and 198 are closed) to allow decant water to flow from the bottom of the decant tank 134 through the discharge pipe 152 to the water drain 162 and further clarification treatment before discharge into a sanitary sewer. The solids sensor 286 monitors the flow of the cracked sludge from the tank. The solids sensor 286 monitors the flow of the decanting materials (first, watery residue and then second, changing to the slurry). When draining of the residual water completes, the valve 154 closes. The valves 158, 164, 186, and 214 open. Valves 166, 138, 146, and 148 are closed. The pump 160 starts. The pump 160 moves the stratified sludge through the decant solids discharge pipe 156, 184, and 212 to the superheater tank 178. Upon completion of draining the decant solids and transfer to the superheater tank 17, the pump 160 stops and valves 186 and 214 close. The empty tank 134 is washed as discussed above to become ready for receiving a subsequent batch of skimmed sludge for processing. The valve 158 is closed and the valve 154 opened to discharge the wash water and residual material from the decant tank 134 to the water drain 162.

The steam pressure relief valve 208 operates to communicate the steam heat media to the heater matrix 210 for pathogen kill stage treating of the cracked sludge and fats in the superheater 178. A temperature sensor monitors the process temperature and the PLC 16 adjusts the supply of heat appropriately to maintain the cracked sludge and fats in the superheater 178 at the predetermined temperature for the predetermined dwell time for pathogen kill Generally, pathogen kill stage processing is about 200° F. to about 220° F. with a dwell time of about 12 to 30 minutes, and more particularly, about 12-15 minutes. The pathogen kill process keeps the SPN solids and fats fresh and able to sit longer in tankers before transport as well as reducing odors. A tanker thus may be held on site rather than transporting a less-then-full load to a rendering plant.

Upon pasteurization, the valves 176 and 180 open to drain residual water to the drain 162. The valve 180 closes, and the valves 170, 158, 164 and 166 open. Valves 150, 154, 194, 198 and 186 close. The pump 160 communicates the treated cracked sludge from the superheater 178 to the transport tanker 28. (The valves 164 and 166 also cooperate with the bypass valves and piping generally 230 and 232, in the event manual shunting is required for rerouting flows to avoid process shutdown for example, such as during equipment servicing.)

The second decant tank 136 receives skimmed sludge from the pump 132 once the first decant tank 134 is filled to capacity. This is accomplished by stopping the pump 132, closing the valve 146 and opening the valve 148. The sensor 288 monitors the level of skimmed sludge and signals the PLC 16 as to reaching capacity. The pump 132 stops and the valve 148 closes.

The controlled heating process operates in the second decant tank 136 as indicated above relative to the first decant tank 134. As the inflow of skimmed sludge reaches the lower portion of the heat matrix 204, the steam supply 82 provides steam through the relief valve 202 and the inlet pipe 200 to heat the skimmed sludge to an initial pre-heat of about 115° F. or for a holding temperature pending additional skimmed sludge. Upon reaching capacity, the pump 132 stops and the valve 148 closes. The PLC 16 monitoring the temperature signal of the temperature probe 292, supplies heat to the skimmed sludge in the decant tank 136. The cracking skimmed sludge stratifies in the decant tank 136 as residual water and cracked sludge solids and fats.

Upon completion of processing, the steam supply 82 stops by closing the pressure relief valve 202. The decant valve 194 and the residual water discharge valve 198 open. This allows residue water to flow through the decant water discharge pipe 196 to the drain 162. The solids sensor 286 monitors the flow of the decanting materials (first, watery residue and then second, changing to the slurry). Once the residue water is drained, the valve 198 closes. The valves 158, 164, 186, and 214 open. Valves 150, 154, 166, 138, 146, and 148 are closed. The pump 160 starts, and the decant solids (the slurry of cracked sludge solids and fats) flow through the discharge pipe 156, 184, and 212 to the superheater 178. Upon completion of the transfer, the valve 194 closes; the tank 136 is washed to make ready for subsequent processing of receiving skimmed sludge, cracking the skimmed sludge, and discharging the decant solids and residue water.

As discussed above, the steam pressure relief valve 208 operates to communicate the steam heat media to the heater matrix 210 for pathogen kill treating the cracked sludge and fats in the superheater 178. A temperature sensor monitors the process temperature and the PLC 16 adjusts the supply of heat appropriately to maintain the cracked sludge and fats in the superheater 178 at the predetermined temperature for the predetermined dwell time for pathogen kill Upon pasteurization, the valves 176 and 180 open to drain residual water to the drain 162. The valve 180 closes, and the valves 170, 158 and 166 open. The valves 150, 154, 194, 198 and 186 close. The pump 160 communicates the treated cracked sludge and fats from the superheater 178 to the transport tanker 28.

The present system accordingly provides a continuing process of stratifying raw sludge to yield skimmed sludge, filling the decant tank with skimmed sludge, processing the skimmed sludge, and discharging residual water and separated SPN solids and fats, alternately and continuously relative to the two decant tanks 134, 136, and independent of the operations involving the decant tanks 42, 44.

With reference to FIG. 3, the automated batch process apparatus 270 receives watery sludge from the processing facility 22 into the dissolved air flotation tank 30. Sludge skimmed from the dissolved air flotation tank 30 collects in the compartment 32, and subsequently transfers by the pump 40 to the decant tank 42 through the open valves 36 and 52. The polymer inserter 43 (not illustrated) may be employed. Upon sensing by the sensor 288 that the level of the skimmed sludge received in the decant tank 42 reaches the lower end of the heat matrix 84, the pressure relief valve 80 opens to communicate steam from the steam supply 82. Once at capacity of the decant tank 42, the pump 40 stops and valves 36 and 52 close. The controlled heating at the predetermined temperature with the graduated heat matrix 84 during the predetermined dwell time agitates and mixes the skimmed sludge. The sludge cracks and separates into the water portion and stratified sludge solids and fats within the decant tank 42.

Upon completion of the cracking of the skimmed sludge, the valve 80 closes. The valve 58 opens to drain the residual water through the pipe 56 into the drain 24 for water treatment processing prior to discharge to a sanitary sewer system. The solids sensor 286 monitors the flow of the decanting materials (first, watery residue and then second, changing to the slurry). The solids sensor communicates a signal to the PLC 16 as to the turbidity of the decanting materials (i.e., the water and then the slurry). The valve 58 closes after completing the discharge of the residual water. The valve 62 opens and the pump 64 communicates the cracked sludge selectively to the transport 26 or, for non-ferric sludge, to the superheater 178. For ferric sludge, the valve 176 is closed and the valve 70 opens for communicating through the cracked solids pipe 60 and discharge into the transport 26. The decant tank 42 is washed as discussed above.

For non-ferric sludge, the valves 70 and 158 close and the valve 176 opens. The pump 64 transfers the cracked sludge to the superheater 178. The valve 176 closes and the pressure relief valve 208 opens to communicate the steam heat media 82 to the heater matrix 210. A temperature sensor monitors the pathogen kill process temperature and the PLC 16 adjusts the supply of heat appropriately to maintain the cracked sludge in the superheater at the predetermined temperature for the predetermined dwell time. Generally, pathogen kill stage processing is about 200° F. to about 220° F. with a dwell time of about 12 to 30 minutes, and more particularly, about 12-15 minutes. Upon pasteurization, the valves 158 and 70 open, and the pump 64 communicates the treated cracked sludge from the superheater 178 to the transport tanker. The decant tank 42 is washed as discussed above.

The controller 12 monitors the operation and status of the components of the system 10. Alarms, such as buzzers and lights, alert an operator to problems in processing or equipment. The controller 12 presents operation information (temperatures, flows, material levels, dwell times, and equipment status) on the display 14 for an operator to monitor the equipment and process, direct actions of the system, and to enter data and commands as appropriate during operation of the system. The controller 12 communicates with the programmable logic controller 16 that directly connects to the system monitoring and control devices (pumps, valves, sensors, push-buttons and the like). The PLC 16 receives status signals and therefore operates both sides of the sludge separation system 10 (ferric and non-ferric sludge separation 18, 20, respectively) as well as the sequential sets of decant tanks 42, 44 and 134, 136. It is to be appreciated that additional decant tanks may readily be provided in accordance with present disclosure and teaching herein for the sludge separation system 10 as may be required for a particular meat processing facility. Further, the controller 12 may be configured to selectively turn off automated operation of either the ferric or non-ferric sides 18, 20, for cessation or for manual processing such as may be required for problem correction or for equipment maintenance or replacement.

It is thus seen that the foregoing describes systems with decanting apparatus and processing methods for continuous automated separation of animal by-products sludge generated by meat processing facilities, which incorporates the batch process feature in alternating decant tanks for cracking the on-going supply of raw ferric and non-ferric watery SPN sludge generated by such facilities. The system and method reduces the volume of water within the sludge transported from a meats processing facility to a rendering facility while increasing the quality of the valuable fats and SPN solids derived from the raw watery SPN sludge. Pasteurization treatment of non-ferric cracked SPN sludge and fats reduces odors and with reduced opportunity for pathogens reduces the development of free fatty acids so that non-ferric sludge may sit longer in a tanker waiting transport. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, those skilled in the art may make modifications, variations and changes thereto without departure from the spirit and scope of the invention as described by the following claims.

What is claimed is:

1. A sludge separation system for cracking sludge, comprising:
   a source of sludge;
   at least one decant vessel comprising:
      a cylindrical body and a conical portion,
      a sludge inflow intermediate opposing top and bottom ends of the at least one decant vessel, for communicating sludge from the source into the at least one decant vessel for initially filling the conical portion;
      a discharge in the bottom end and communicating selectively with a decanted liquids discharge and a decanted solids discharge,
      a heat matrix disposed within the cylindrical body and having a graduated heat transfer ranging from a first heat transfer capacity at a lower end to a second heat transfer capacity at an upper end, the first heat transfer capacity greater than the second heat transfer capacity;
      a heat member disposed in the conical portion of the decant vessel for heated agitation and mixing of sludge therein during filling of the decant vessel and to elevate the sludge from an ambient temperature to a first temperature below a cracking temperature;
   a supply of a heat media for communicating selectively through the heat member, and upon filling of the at least one decant vessel through the heat matrix, for elevating a process temperature of the sludge from the first temperature to the cracking temperature while processing the sludge to form separated decanted liquid and decanted solids;

a temperature sensor for monitoring the process temperature;

a solids sensor for monitoring a flow of decanted solids from the at least one decant vessel; and a programmable controller responsive to the temperature sensor for adjusting the heat media communicated through the heat matrix and responsive to the solids sensor for determining the flow of the decanted solids following completion of a sludge cracking process, whereupon the process temperature being at the cracking temperature causes the sludge to crack into the decanted liquid and the decanted solids, and discharging the decanted liquid through the decanted liquids discharge until the solids sensor senses decanted solids discharging therethrough and thereupon closing the decanted liquids discharge and opening the decanted solids discharge for discharge of the decanted solids to a transport apparatus for providing the decanted solids to a renderer.

2. The sludge separation system as recited in claim 1, further comprising a second decant vessel and a valve selectively positioned for communicating sludge to the first decant vessel and to the second decant vessel.

3. The sludge separation system as recited in claim 1, wherein the programmable controller comprises:

a microprocessor configured for directing the sludge from the source to the at least one decant vessel, for monitoring the processing of the sludge within the at least one decant vessel to form the decanted liquid and the decanted solids, for discharging the decanted liquids through the decanted liquids discharge and the decanted solids through the decanted solids discharge, and repeating the process; and a display screen communicating with the microprocessor for display of the status of the sludge separation system and the processing of the sludge.

4. The sludge separation system as recited in claim 3, further comprising configuring the microprocessor for receiving and executing control commands for selective manual operation of the sludge separation system and process.

5. The sludge separation system as recited in claim 1, wherein the process temperature ranges from about 140° F. to about 200° F. and a dwell period ranges from about 2 hours to about 6 hours, for a 6,000 gallon capacity decant vessel.

6. The sludge separation system as recited in claim 1, further comprising:

a heater tank having a decanted solids intake for receiving the discharged decanted solids;

a heating device for heating the decanted solids received in the heater tank to a predetermined second elevated temperature for a predetermined second dwell period of time, the second elevated temperature greater than an ambient temperature.

7. The sludge separation system as recited in claim 6, wherein the second elevated temperature ranges from about 200° F. to about 220° F. and the second dwell period ranges from about 12 minutes to about 30 minutes, for pathogen kill processing.

8. The sludge separation system as recited in claim 1, further comprising:

a dissolved air flotation tank that receives waste sludge having a first water content from a processing facility, which waste sludge stratifies as stratified sludge having a second water content less than the first water content and residual water separated by a boundary layer;

a skimmer for skimming the stratified sludge into a compartment for the supply of sludge; and a discharge for communicating the residual water to a drain for treatment before discharge.

9. The sludge separation system as recited in claim 1, wherein the lower end of the heat matrix has a first surface area providing the first heat transfer capacity and the upper end of the heat matrix has a second surface area providing the second heat transfer capacity, the first surface area greater than the second surface area.

10. The sludge separation system as recited in claim 1, wherein the heat member comprises a pair of spaced-apart tubes that extend at opposing ends through a wall of the conical portion, a joiner tube connector attached to respective adjacent ends of the pair of tubes, a supply tube connector attached to an opposing end of one of the pair of tubes and to the heat matrix, and a discharge connector attached to an opposing end of the other of the pair of tubes, for communication of the heat media therethrough.

11. The sludge separation system as recited in claim 1, further comprising the controller configured for pre-heating the sludge in the decant vessel while filling thereof to a pre-process temperature of about 115° F.

12. A method for separating animal by-product waste sludge into decanted residual water and SPN solids, comprising the steps of:

(a) skimming animal by-product waste sludge from a dissolved air flotation tank having an animal by-product waste sludge inlet for receiving an inflow of waterborne animal by-product sludge from a meat processor facility;

(b) communicating the skimmed animal by-product waste sludge selectively to a first decant tank and a second decant tank alternatively, the first decant tank and the second decant tank each comprising:

a cylindrical portion and a conical portion therebelow;

an animal by-product waste sludge inflow intermediate opposing top and bottom ends of the decant tank and receiving therethrough a flow of animal by-product waste sludge skimmed from the air floatation tank;

a discharge in the conical portion and communicating selectively with a decanted water discharge outlet and a SPN solids discharge outlet;

a heat matrix disposed within the cylindrical portion and having a graduated heat transfer ranging from a first heat transfer capacity at a lower end to a second heat transfer capacity at an upper end, the first heat transfer capacity greater than the second heat transfer capacity;

a heat member disposed in the conical portion for heated agitation and mixing of animal by-product waste sludge and elevating a temperature thereof to a pre-process temperature less than a process temperature until reaching a capacity of the decant tank for step (c);

a level sensor for generating a level signal indicating a level of the animal by-product waste sludge within the decant tank;

a temperature sensor for generating a temperature signal indicating a process temperature of the animal by-product waste sludge within the decant tank during application of heat by the heat matrix for a predetermined dwell period for cracking the animal by-product waste sludge to form the decanted residual water and SPN solids; and a solids sensor for generating a solids signal indicating a flow through the discharge of the SPN solids formed in the decant tank during the cracking application of the heat by the heat matrix; and providing a controller configured for receiving and responding to signals from the respective level sensor, temperature sensor, and solids sensor;

(c) sensing with the level sensor the level of skimmed animal by-product waste sludge received in the respective first decant tank and second decant tank until a filled level is detected, then alternately repeating steps (b) and (c) for the other of the respective second decant tank and the first decant tank;

(d) upon the level of the skimmed animal by-product waste sludge reaching a lower portion of the heat matrix disposed in the respective decant tank, supplying a heat media to the heat matrix for elevating the process temperature to a predetermined cracking temperature for cracking the animal by-product waste sludge into the residual water and SPN solids;

(e) sensing the process temperature within the respective first and second decant tank and adjusting the heat media to maintain the process temperature at the cracking temperature for the dwell period for cracking of the animal by-product waste sludge therein into the residual water and SPN solids;

(f) sensing development of sludge cracking that stratifies the animal by-product waste sludge as the residual water and cracked sludge SPN solids;

(g) upon completion of the cracking of the animal by-product waste sludge, discharging the residual water through the discharge to the decanted water discharge outlet; and (h) upon the solids sensor sensing flow of SPN solids through the discharge, closing the decanted water discharge outlet and opening the SPN solids discharge outlet for communicating the SPN solids to a transport for delivery thereof to a rendering facility.

13. The method as recited in claim 12, whereupon a controller operative for receiving from the respective first decant tank and the second decant tank the signal from the level sensor, the temperature signal, and the solids signal thereof, being signaled by the respective level sensor sensing that the respective first decant tank and second decant tank has received a predetermined capacity volume of skimmed animal by-product waste sludge, discontinues the communicating of skimmed animal by-product waste sludge to the respective one of the first decant tank and second decant tank and commences communicating of the skimmed animal by-product waste sludge alternatively to the respective other one of the second decant tank and first decant tank;

being signaled with the respective process temperature signal, adjusting the heat media within the respective heat matrix for the cracking process; and being signaled by the respective solids sensor as to flow of SPN solids through the respective discharge, closing the decanted water discharge outlet and opening the SPN solids discharge outlet.

14. The method as recited in claim 12, wherein the process temperature ranges from about 140° F. to about 200° F. and the dwell period ranges from about 2 hours to about 6 hours, for a 6,000 gallon capacity decant tank.

15. The method as recited in claim 12, wherein the sludge SPN solids is non-ferric, and prior to communicating in step (h) further comprising the steps of:

communicating the non-ferric SPN solids to a heater tank; and heating the non-ferric SPN solids in the heater tank to a predetermined elevated temperature for predetermined second dwell period.

16. The method as recited in claim 15, wherein the elevated temperature ranges from about 200° F. to about 220° F. and the second dwell period ranges from about 12 minutes to about 30 minutes.

17. The method as recited in claim 12, wherein elevating the sludge temperature comprises providing supplemental heat into the conical portion by the heat media flowing through a pair of spaced-apart tubes disposed therein and connected to the heat matrix, the tubes extending at opposing ends through a wall of the conical portion and a joiner tube connector attached to respective adjacent ends of the pair of tubes, an opposing end of one of the pair of tubes connected to the heat matrix, and an opposing end of the other of the pair of tubes connected to a discharge connector, whereby the supplemental heat within the conical portion facilitates agitation and mixing of the skimmed animal by-product waste sludge therein and increasing the temperature from an ambient temperature to a first temperature less than the process cracking temperature.

18. The method as recited in claim 12, wherein the step of preheating animal by-product waste sludge during filling of the respective first decant tank and second decant tank comprises heating to the pre-process temperature of about 115° F.

19. A sludge separation system for continuous cracking animal by-product waste sludge to yield SPN solids, comprising:

a source of animal by-product waste sludge;

a first decant vessel and a second decant vessel, the first decant vessel and second decant vessel each comprising:

a holding tank, a sludge inflow intermediate opposing top and bottom ends of the holding tank for receiving a flow of animal by-product waste sludge from the source;

a discharge in the bottom end and communicating selectively with a decanted water discharge outlet and a SPN solids discharge outlet, a heat matrix disposed within the holding tank and having a graduated heat transfer ranging from a first heat transfer capacity at a lower end to a second heat transfer capacity at an upper end, the first heat transfer capacity greater than the second heat transfer capacity;

a level sensor for generating a level signal indicating a level of the animal by-product waste sludge received in the holding tank;

a temperature sensor for generating a temperature signal indicating a process temperature of the animal by-product waste sludge in the holding tank during application of heat by the heat matrix for cracking the animal by-product waste sludge to form separated residual water and SPN solids; and a solids sensor for generating a solids signal indicating a flow through the discharge of the SPN solids developed in the holding tank during the cracking application of the heat by the heat matrix during a predetermined dwell period;

a supply of a heat media for communicating through the heat matrix for a process of cracking the animal by-product waste sludge to form the separated residual water and SPN solids;

a programmable controller operative for receiving from the respective first decant tank and the second decant tank the signal from the level sensor, the process temperature signal, and the solids signal thereof and responsive to:

the respective level sensor for controlling the inflow of the animal by-product waste sludge selectively into the first decant vessel and the second decant vessel alternatively for cracking processing, the respective temperature sensor for determining the process temperature and adjusting the heat media communicated through the heat matrix within the respective first decant vessel and second decant vessel, and upon completion of cracking process within the respective first decant vessel and second decant vessel, decanting residual water therefrom through the decanted water discharge outlet and the solids sensor upon detecting the SPN solids flow through the discharge, closing the decanted water discharge outlet and opening the SPN solids discharge outlet for communicating the SPN solids to a transport for transportation to a rendering facility; and a display for displaying system status as determined by the controller receiving the respective level signals, temperature process signals and solids signals.

20. The sludge separation system as recited in claim 19, further comprising:

a dissolved air flotation tank that receives animal by-product sludge having a first water content from a processing facility for a dwell time during which the animal by-product sludge stratifies as animal by-product waste sludge having a second water content less than the first water content and decantable water;

a skimmer for skimming the animal by-product waste sludge into a sludge supply compartment;

an outlet for draining the decantable water to a drain; and a discharge from the sludge supply compartment for communicating the animal by-product waste-sludge to the selected one of the first and second decant vessels based on a status of the first and second decant vessels, wherein the programmable controller is configured for maintaining a respective status signal from the first and second decant vessels which status signal indicates the status selected from ready to receive animal by-product waste sludge, at capacity of animal by-product waste sludge, separation processing, decanting of decantable water, decanting of SPN sludge, tank needs cleaning, and cleaning.

21. The sludge separation system as recited in claim 19, wherein the lower end of the heat matrix has a first surface area and the upper end of the heat matrix has a second surface area, the first surface area greater than the second surface area.

22. The sludge separation system as recited in claim 19, further comprising:

a heater tank having an inlet for receiving SPN solids having non-ferric residues from a respective one of the first and second decant vessels and an outlet for discharging treated SPN solids; and a heating device for heating the SPN solids in the heater tank to a predetermined elevated temperature for a predetermined second period of time, the elevated temperature greater than an ambient temperature.

23. The sludge separation system as recited in claim 22, wherein the elevated temperature ranges from about 200° F. to about 220° F.

24. The sludge separation system as recited in claim 23, wherein the second dwell period ranges from about 12 minutes to about 30 minutes.

25. The sludge separation system as recited in claim 19, wherein the holding tank comprises a cylindrical body and a conical discharge portion therebelow, the heat matrix disposed within the cylindrical body; and further comprising a supplemental heat member disposed in the conical portion of the holding tank for heated agitation and mixing of animal by-product waste sludge therein during filling of the holding tank with animal by-product waste sludge and for elevating the temperature thereof from ambient temperature to a first temperature less than the process temperature.

26. The sludge separation system as recited in claim 25, wherein the heat member comprises a pair of spaced-apart tubes that extend at opposing ends through a wall of the conical portion, a joiner tube connector attached to respective adjacent ends of the pair of tubes, a supply tube connector attached to an opposing end of one of the pair of tubes and to the heat matrix, and a discharge connector attached to an opposing end of the other of the pair of tubes, for communication of the heat media therethrough.

27. The sludge separation system as recited in claim 19, wherein the process temperature ranges from about 140° F. to about 200° F.

28. The sludge separation system as recited in claim 27, wherein the dwell period ranges from about 2 hours to about 6 hours.

29. The sludge separation system as recited in claim 19, further comprising the controller configured for pre-heating the animal by-product waste sludge in the holding tank while filing thereof to a pre-process temperature of about 115° F.

* * * * *